Dec. 9, 1952 F. W. McCONNEL ET AL 2,620,614
GRAIN HARVESTING MACHINE
Filed Aug. 25, 1949 4 Sheets-Sheet 4

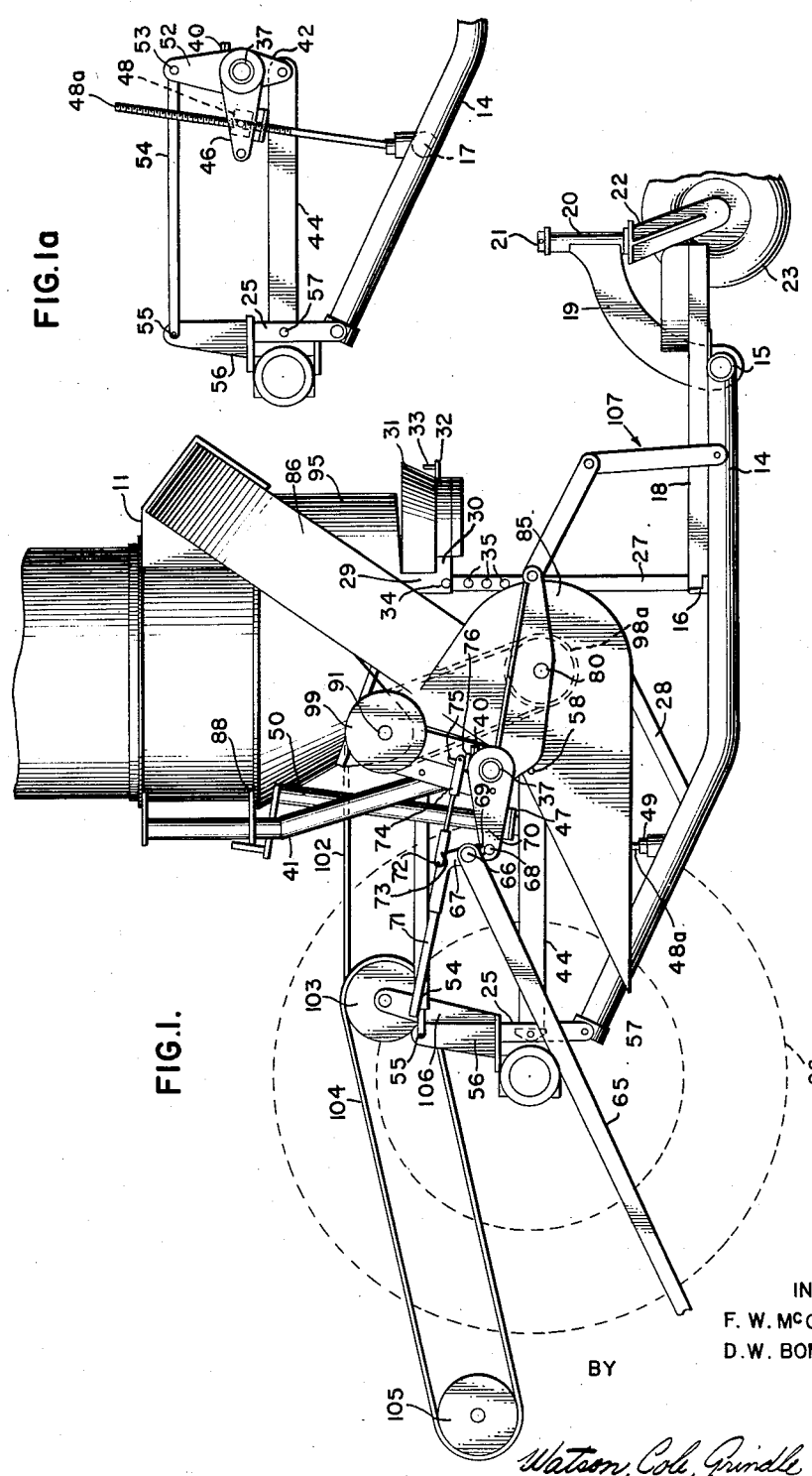

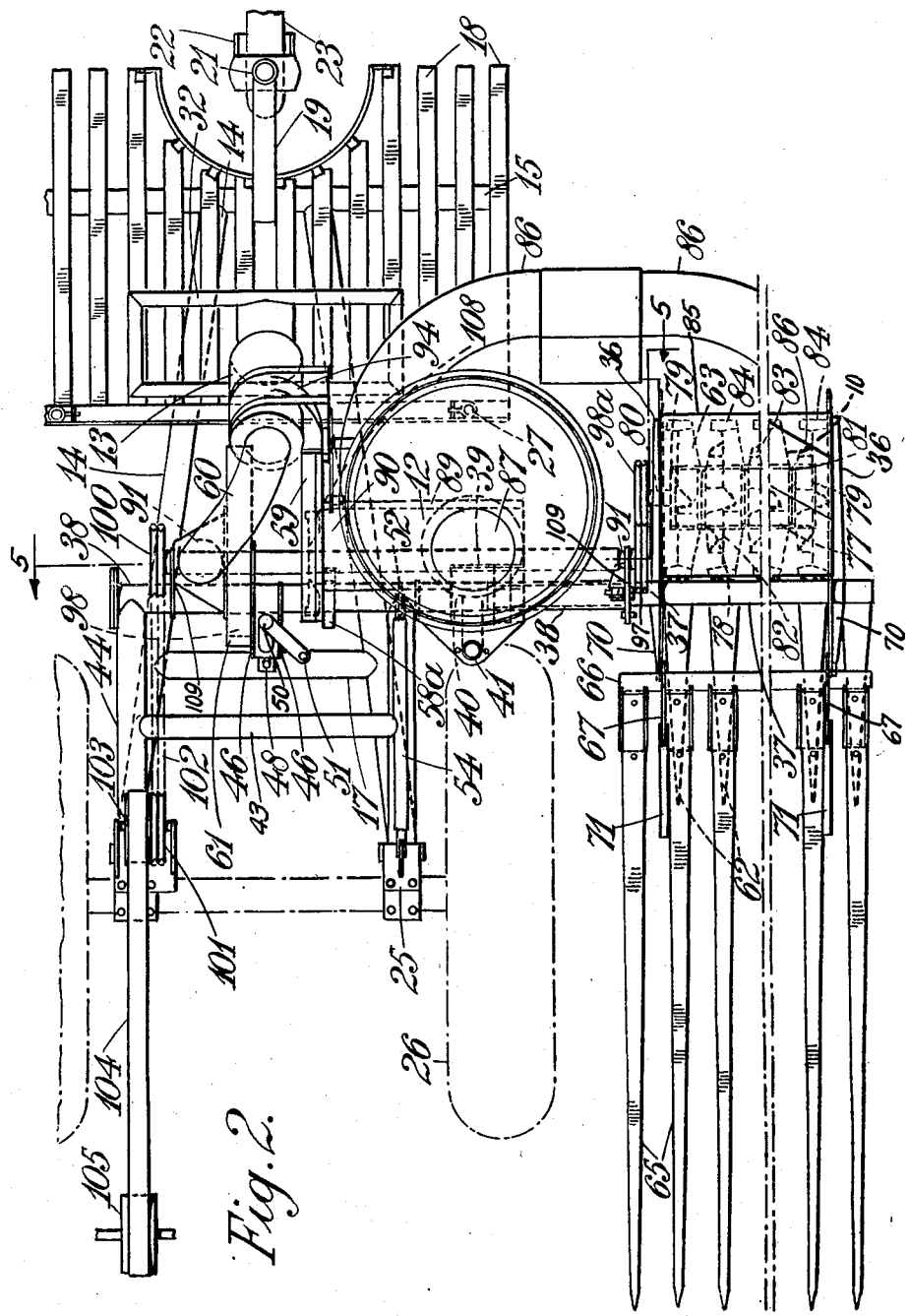

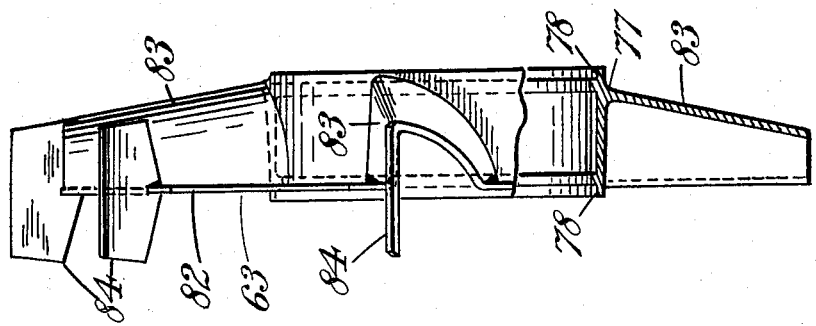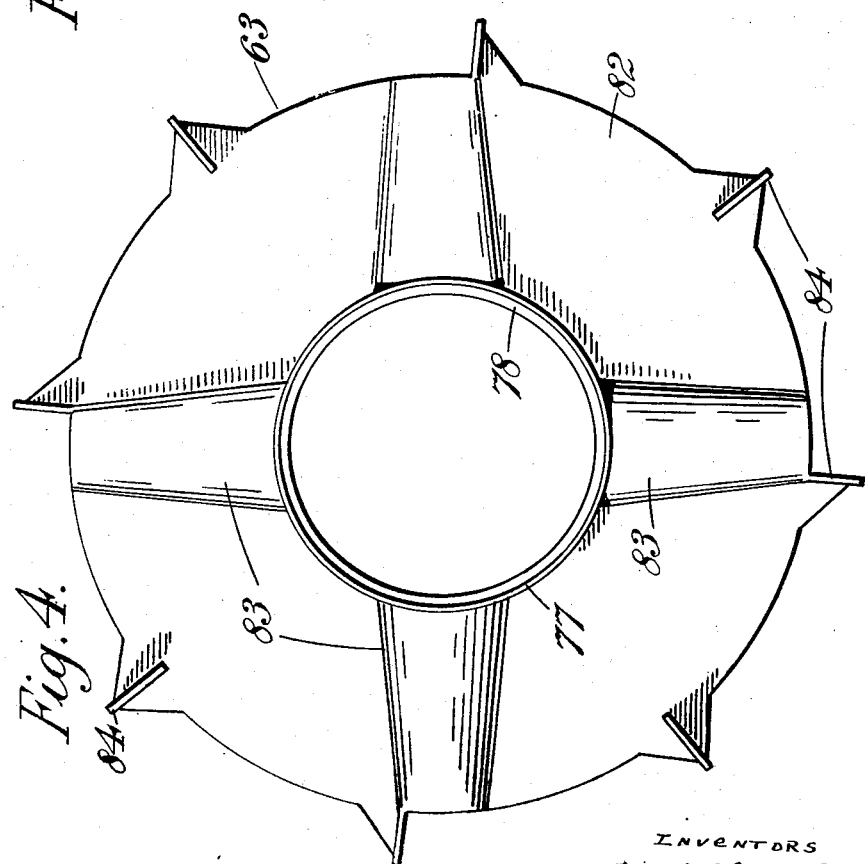

INVENTORS
F. W. McConnel
+ D. R. Bomford
By Watson, Cole, Grindle & Watson

Patented Dec. 9, 1952

2,620,614

UNITED STATES PATENT OFFICE 2,620,614

GRAIN HARVESTING MACHINE

Frederic Whigham McConnel, Pensax, and Douglas Raymond Bomford, Evesham, England, assignors to McConnel Bomford Limited, Pensax, England, a British company Application August 25, 1949, Serial No. 112,304
In Great Britain August 31, 1948

4 Claims. (Cl. 56—128)

This invention relates to grain harvesting machines of the kind which threshes out the grain from the ears before the stalks of the crop are cut from the ground and collects the separated grain, and which kind of machine comprises a carriage on which a number of beaters are mounted to rotate about a horizontal axis extending transversely to the direction of travel of the carriage, which beaters provide between them gaps and gathering members projecting forwardly of the beater members and providing between them tapering spaces which guide the ears and stalks between the beaters, and which beaters are partly surrounded by a casing which collects the separated grain and is provided with means for delivering it to a desired location.

One object of the present invention is to prevent any husks or any heads of grain which may have been broken off the stalks by the beaters from being carried over to the delivery location.

According to this invention a grain harvesting machine of the kind referred to comprises means for conveying the material collected by the casing around the beaters, to an awner which removes the grain from any severed heads and means for conveying the resulting mixture to a pneumatic separator where the lighter constituents are separated from the grain, which latter passes to the delivery location.

Preferably, the beaters together with the surrounding casing, are so constructed as to form an air impeller which blows the material to a cyclone, which cyclone separates the lighter particles and delivers the grain, together with any severed heads to the aforesaid awner.

The lower part of each rotatable beater is located in an arcuate trough which may be attached to one of the gathering members, which troughs are spaced apart to permit the passage of the stalks between them, and the beaters are provided around their periphery with a number of spaced radially-extending blades which in passing through the troughs create an air current and are rotated in such a direction that the air current carries the separated grain upwardly into the casing which surrounds the upper part of the beaters, which casing is provided with a delivery conduit for conveying the grain in the air stream to the aforesaid cyclone.

The beater members may each comprise a hollow cylindrical hub-portion having an internal spigot groove formed at each end thereof, which hub-portions are clamped side by side between two plates fixed to a driving shaft, a locating ring being accommodated in each pair of registering spigot grooves. Each hub-portion is encircled by a web so shaped as to provide a number of scoop-shaped beaters on each side thereof, so that upon rotation a convexly-curved surface of the scoop impinges upon the ears. This convex surface may be provided with a number of corrugations which extend in a direction towards and away from the driving shaft. The web is also provided with the aforesaid radially-arranged blades.

The cyclone may comprise an upright cylindrical casing open at the top and provided with an outlet at the bottom, while the aforesaid delivery conduit from the beater casing is arranged to meet the cylindrical wall substantially tangentially and near the bottom thereof. With this arrangement, the lighter material is blown out of the top of the cyclone while the grain and severed heads fall through the outlet. The outlet may be provided with a conduit connected to the receiving end of the awner.

The awner may comprise a horizontally-disposed trough closed at the top by a cover-plate having an opening at the receiving end with which the last said conduit communicates, and a rotatable shaft mounted in bearings in the end of the walls of the trough and having a number of blades distributed around the shaft and spaced apart along the length thereof, which blades are inclined to planes normal to the shaft so as to propel the grain from the receiving end of the trough to the other end which is provided with an outlet, and the bottom of which trough is provided with a number of upstanding lugs so spaced apart that each blade may pass between two lugs with a small space on either side of the blade.

The pneumatic separator associated with the awner may comprise an impeller having its suction side communicating with the delivery end of the awner and having its pressure side communicating with a cyclone chamber having an opening at the bottom for the grain and an outlet at the top for separated husks. A second impeller may be associated with said upper opening.

The driving shafts of the beater, awner and the impeller associated with the awner may be arranged parallel with one another and may be driven through belt gearing from a single driving shaft or countershaft.

The aforementioned parts may all be mounted on a trailer drawn from a motor driven tractor with the beater extending to one side of the trailer or it may be mounted directly on the tractor.

In the case where the tractor is of the kind provided with a power output shaft driven by its engine said shaft is arranged to drive said beater, awner, air impeller at the appropriate speeds through said belt gearing.

It is desirable to provide means for adjusting the beater relatively to the ground so that it may be most effective for different heights of crops.

For this purpose, the beater, together with the cyclose awner and separator, are mounted on a framework which is so adjustable in an up-and-down direction so that the tension in the various driving belts may be unaffected by this movement.

In order to lift beaten down crops, a number of lifting members are arranged to extend forwardly of the beater members and are secured to a holder which is pivotally and adjustably mounted on the tubular member which carries the beater casing, so that the forward ends of the lifting members may be positioned at the required height. The adjustable mounting may comprise a toggle link mechanism whereby the lifting members may be quickly moved between two limiting positions, while a fine adjustment may be provided by a screw device which varies the effective length of one of the links.

The following is a description of one form of harvester according to this invention, reference being made to the accompanying drawing in which:

Figure 1 is a side elevation of the apparatus,

Figure 1A is a partial elevation corresponding to Figure 1, with certain parts removed for clarity, Figure 2 is a top plan view of Figure 1.

Figure 3 is a part section and part elevation of one of the beaters, on an enlarged scale, Figure 4 is a face view of one of the beaters.

Figure 5:
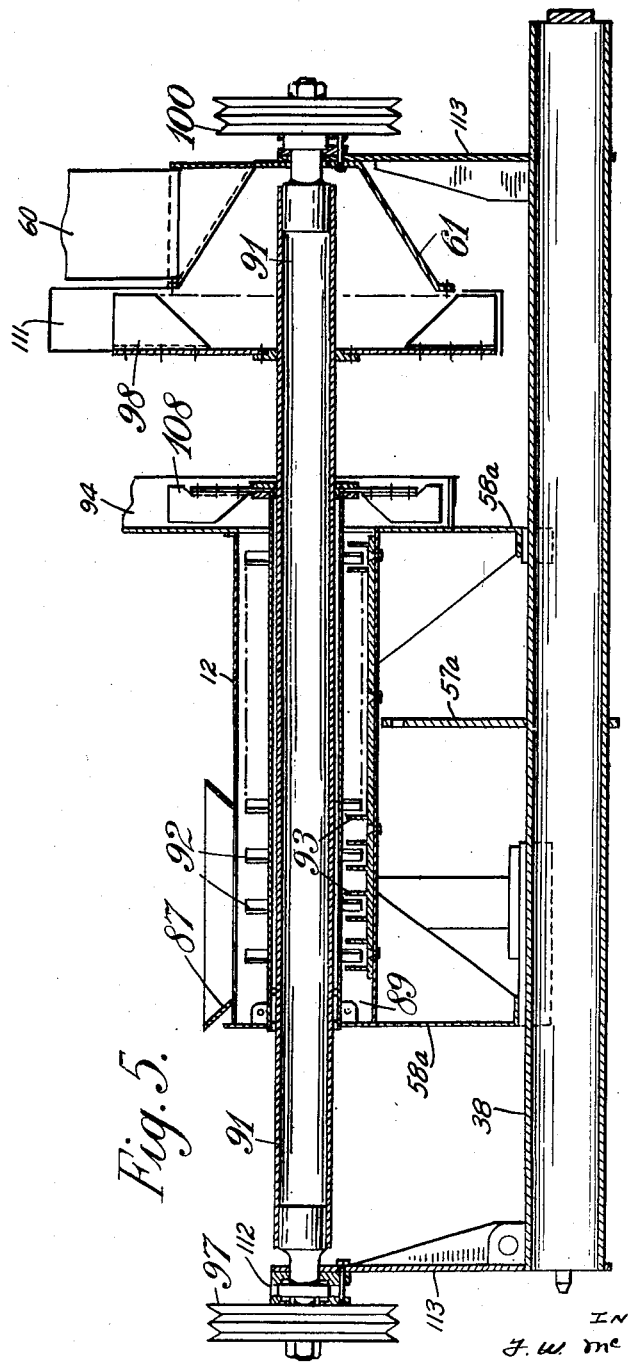
Figure 5 is an enlarged vertical sectional view through the awner, on an enlarged scale, on line 5—5 of Figure 2.

As already indicated, the main parts of the apparatus comprise a beater 10, a primary cleaner 11, an awner 12 and a secondary cleaner 13, all of which parts are mounted on a frame-work which is adjustable in an up-and-down direction in relation to the main chassis of the apparatus. The chassis comprises two tubular frame members 14 which converge as they extend rearwardly and their rearward extremities have secured across them a transverse tubular member 15. There are also secured across the chassis frame members angle section cross member 16 and a short tubular member 17, which latter is near the forward extremities of the chassis members. A platform is formed from a number of slats 18 which extend in a fore-and-after direction across the tubular and angle section cross members 15 and 16. An upwardly and rearwardly curved bracket arm 19 is secured to the tubular member 15 and carries at its extremity a bearing 20 in which is mounted a spindle 21. The spindle is arranged at the upper end of a fork 22 carrying a caster wheel 23. Pivotally connected at 24 to the forward end of each chassis member 14 is an axle mounting 25.

Fixed to the angle section cross member 16 are a number of uprights 27 which are braced to the chassis frame by bracing members 28. Adjustably mounted on one of these uprights is a socket 29 carrying a bracket 30 which supports a funnel 31. A frame 32 at the base of the funnel is provided with spikes 33 for engaging the mouth of a sack. The socket 29 and bracket 30 are retained in the required position on the upright by a peg 34 which may be introduced into any one of a number of holes 35.

The beater is provided with side members 36 (see Figure 2) secured to a cantilever tubular member 37 and which is disposed to one side of the aforesaid chassis. The cantilever tubular member 37 extends into and is secured to a tubular support 38. Secured on either side of the tubular support are angle brackets 39 having a plate 40 extending across them (see Figure 2) to which is fixed an upright 41 carrying the primary cleaner 11. The tubular support 38 extends across and above the chassis side frame members 14 and is provided with downwardly extending arms 42 pivotally connected to a sub-frame 43 which is pivotally secured to the axle support 25. The sub-frame member comprises stout longitudinal tubular members 44 pivotally connected to the axle mounting 25 and the cross member 43. The tubular support 38 has fixed to it two forwardly extending plates 46 between which is pivoted at 47 a nut portion 48. A threaded shaft 48a extends through the nut and is connected to the cross tubular members 17 of the chassis frame by a bearing 49. The other end of the shaft is provided with an extension 50 having a crank handle 51 thus by rotating the threaded shaft the distance of the tubular support 38 from the chassis frame may be adjusted. An upwardly extending arm 52 fixed to the tubular support 38 has pivotally secured to it at 53 one end of a link 54, the other end of which is pivotally connected at 55 to an upstanding bracket 56 on the axle support 25. The distance apart of the pivotal connections 55 and 57 is the same as the distance between the pivotal connection 53 and 58. The parallel link mechanism thus provided tends to maintain level the plate 40 which supports the primary cleaner and other parts of the mechanism while permitting adjustment of the beaters in an up-and-down direction. A tubular support 38 in addition to carrying the beater 10 and the primary cleaner 11 has secured to it the awner 12 which is secured to brackets 57a, 58a on the tubular support. The secondary air cleaner 13 is supported by an impeller casing 59 at the end of the awner and also by its outlet conduit 60 which is secured to a secondary impeller chamber 61 mounted on the tubular support 38.

The beater is provided with forwardly extending guide members 62 which gather in the stalks of the growing corn and guide them between the beaters 63 within the beater casing 85. There also extend forwardly of the beater a number of tines 65 for lifting any of the crop which may have fallen, which tines are secured to an adjustable cross-shaft 66. The cross-shaft has fixed to each end a lever arm 67 extending above and below the cross-shaft, the lower end of which lever arm is provided with a pivot pin 68 extending into a slot 69 in a forward extension 70 of the guide plate 36 of the beater casing thereby enabling the shaft 66 and the tines 65 to be removed from the machine when not required. The upper end of the lever arm 67 is provided with a forwardly extending manipulating hand lever 71 and the upper end of the lever arm has also pivotally connected to it at 72 one end of an extensible link 73, the other end of which is provided with a catch 74 which may be engaged with either of two lugs 75 or 76, formed on the tube 37 whereby the tines may be rotated in operative and inoperative positions.

The beater members 63 may each comprise a hub portion 77 (see Figures 1, 3 and 4) having at each end thereof a spigot groove 78 which hub portions are clamped side by side between two plates 79 fixed to a driving shaft 80 while a locating ring 81 is accommodated in each pair of adjacent spigot grooves. Each hub portion is encircled by a web 82 so shaped as to provide a number of scoop-shaped beaters 83 on each side of the web, and also so shaped that upon rotation of the beaters a convexly curved surface of the scoop impinges upon the ears of grain. The web portion is also provided around its periphery with radially extending blades 84 which extend into arcuate troughs constituting an extension of the gathering member 62, which troughs are spaced apart to permit the passage of stalks between them. The blades in passing through the trough create an air current which carries the separated grain upwardly to the casing 85 which surrounds the upper part of the beaters. The casing is provided with an outlet conduit 86, formed in two parts and held together by a connecting piece 110, the extremity of which conduit merges tangentially with a wall of an upright cylindrical cyclone chamber 11 which constitutes the primary cleaner. The cyclone chamber is open at the top to the atmosphere and any light particles such as empty husks and pieces of straw are blown out into the atmosphere, whereas the separated grain passes down through an opening in the bottom of the cyclone chamber and thence through a funnel 87 in the awner 12. The cyclone separator is supported cantilever fashion by a frame fixed to the tubular upright 41.

The awner (see Figures 2 and 5) comprises a trough 89 having an opening in the cover registering with the opening 87 in the cyclone separator. A horizontal rotatable shaft 91 extends through the trough and carries on it a number of blades 92 extending radially but inclined to the direction of rotation so that as they pass through the grain inside the awner they propel it from the receiving end to the delivery end. The shaft 91 is mounted in bearings 112 carried by brackets 113 which are fixed to the tubular member 38. The bottom of the trough is provided with a number of upstanding lugs 93 between which the blades on the rotatable shaft 91 may pass with a small clearance, so that as the harvested grain passes the moving and fixed blades, the grain is separated from any unthreshed heads which may be broken from the stalks and any particles of straw which may be present are rubbed or broken into smaller pieces. In the case of barley the awns are removed so far as is necessary. The grain and separated particles are fed by the inclined blades out through an opening in an end wall of the trough into the impeller chamber where a fan 108 delivers them through a conduit 94 into the secondary cleaner 13 which is also in the form of a cyclone separator comprising a cylindrical chamber arranged with its axis inclined to the vertical, the lower end of the chamber is open and delivers the grain into chute 95 arranged over the aforesaid funnel 31. The upper end of the chamber is connected with a conduit 60 which communicates with the other impeller chamber 61 containing an impeller 98 which is arranged to suck the separated lighter particles down through the conduit 60 and deliver them to atmosphere through a conduit 111. The secondary cleaner 13 is secured by a suitable framework 96 to the side of the primary cleaner and the awner is secured to the tubular support 38 by end plates 109.

In the above arrangement the impellers 98 and 108 and the aforesaid inclined blades 92 are all mounted on the same shaft 91. This shaft and the shaft 80 are connected together by a belt and pulley transmission 97, 98a and the other end of the shaft 91 is provided with a pulley 100 which drives a grooved pulley 101 through a belt 102. The latter grooved pulley is secured to one side of a domed pulley 103 which is driven by a belt 104 fixed to the power output shaft of the tractor which draws the apparatus.

The mounting of the tubular support 38 by the aforesaid parallel link mechanism and the distance the shaft 91 is fixed from the pivotal connections 53, 58 is such that the locus of movement of the shaft 91 and pulley 100 approximates to a circle struck about the axis of the pulleys 101 and 103, which pulleys are mounted in bracket arms 106 fixed to the axle support 25.

The beater is so carried on the tubular support 38 that the tubular member 37 may be withdrawn therefrom and after the belt 98a has been removed and the conduit 86 disconnected the beater may be placed on the platform 18 where it is held in position by the swinging strut 107 which is connected to the side plate 36 while the extension 37 is attached to the upright 27.

As already indicated, a sack holder may be carried on said platform, or a container may be trailed behind the tractor into which the separated grain may be conveyed by a suitable conduit from the pneumatic separator. The container may be mounted either on wheels or skids.

We claim:

1. A machine for threshing growing corn comprising a wheeled chassis frame, a carrier movably mounted on said chassis frame and having a first part thereof extending over the frame and a second part thereof to one side of the frame, means for adjusting the carrier in an up-and-down direction, a beater mounted on the second part of the carrier and comprising a number of coaxially arranged hollow hub portions from which extend beater members formed as impellers, a driving shaft extending through said hub portions, which hub portions each have spigot grooves at each end thereof and locating ring in the grooves and which hubs are clamped side by side by plates in said driving shaft, a casing encircling said beater members, a primary cleaner and awner mounted one above the other on the first part of said carrier, together with a secondary cleaner to one side thereof, a conduit between said casing and said primary cleaner, means for feeding the grain from the primary cleaner to the awner and means for feeding the grain and husks from the awner to the secondary cleaner.

2. A machine for threshing a growing crop comprising a wheeled chassis frame, a carrier movably mounted on said chassis frame and having a first part thereof extending over the frame and a second part thereof to one side of the frame, means for adjusting the carrier in an up-and-down direction, a beater mounted on the second part of the carrier, a primary cleaner and an awner mounted one above the other on the first part of the carrier, together with a secondary cleaner to one side thereof, means for conveying the threshed grain from the beater to the primary cleaner, a conduit between the cleaner and awner and means for feeding the grain and husks from the awner to the secondary cleaner, which awner comprises a horizontally disposed trough, having end walls and a coverplate formed with an opening at the receiving end into which said conduit extends, bearings in said end walls conveying the shaft and a number of blades distributed around the shaft and spaced apart along the length thereof, which blades are inclined to a plane normal to the shaft so as to propel the grain from the receiving end of the trough to an outlet at the other end, and the bottom of which trough is provided with a number of upstanding lugs so spaced apart that each blade may pass between two lugs with a small space on either side of each blade.

3. A machine for threshing a growing crop comprising a wheeled chassis frame, a carrier movably mounted on said chassis frame and having a first part thereof extending over the frame and a second part thereof to one side of the frame, means for adjusting the carrier in an up-and-down direction, a beater mounted on the second part of the carrier, a primary cleaner and an awner mounted one above the other on the first part of the carrier, together with a secondary cleaner to one side thereof, means for conveying the threshed grain from the beater to the primary cleaner and means for feeding the grain from the primary cleaner to said awner which surrounding cleaner comprises an impeller having its suction side communicating with the delivery end of the awner and having its pressure side communicating with a cyclone chamber having an opening at the bottom for the separated grain and an outlet at the top for the separated husks.

4. A machine for threshing a growing crop comprising a wheeled chassis frame, a carrier movably mounted on said chassis frame and having a first part thereof extending over the frame and a second part thereof to one side of the frame, a beater mounted on the second part of the carrier, a primary cleaner and an awner mounted one above the other on the first part of the carrier, together with a secondary cleaner to one side thereof, means for conveying the threshed grain from the beater to the primary cleaner, means for feeding the grain to said awner, means for feeding the grain and husks from the awner to the secondary cleaner, the means for mounting said carrier on said chassis frame comprising a parallel link mechanism so connected to the chassis frame that one link is movable in an up-and-down direction, said beater, primary cleaner, awner, and secondary cleaner, all being carried by the up-and-down movable link and means for adjusting the position of said link in an up-and-down direction.

FREDERIC WHIGHAM McCONNEL.
DOUGLAS RAYMOND BOMFORD.

REFERENCES CITED

The following references are of record in the file of this patent:

UNITED STATES PATENTS

| Number | Name | Date |
|---|---|---|
| 1,134,443 | Engle | Apr. 6, 1915 |
| 2,076,523 | Ballack et al. | Apr. 13, 1937 |
| 2,495,417 | McConnell et al. | Jan. 24, 1950 |
| 2,514,519 | Ryan | July 11, 1950 |

FOREIGN PATENTS

| Number | Country | Date |
|---|---|---|
| 345,135 | France | Oct. 1, 1904 |
| 402,899 | Germany | Sept. 19, 1924 |
| 572,040 | Great Britain | Sept. 20, 1945 |